United States Patent
Yeh

(10) Patent No.: US 11,641,166 B2
(45) Date of Patent: May 2, 2023

(54) RECTIFIER CIRCUITS, SYNCHRONOUS RECTIFIER CIRCUITS, AND RELATED ELECTRIC DEVICES

(71) Applicant: Wen-Chung Yeh, Taipei (TW)

(72) Inventor: Wen-Chung Yeh, Taipei (TW)

(*) Notice: Subject to any disclaimer, the term of this patent is extended or adjusted under 35 U.S.C. 154(b) by 84 days.

(21) Appl. No.: 17/337,674

(22) Filed: Jun. 3, 2021

(65) Prior Publication Data
US 2021/0384842 A1 Dec. 9, 2021

(30) Foreign Application Priority Data
Jun. 5, 2020 (TW) ................................ 109118915

(51) Int. Cl.
*H02M 3/335* (2006.01)
*H02M 1/00* (2006.01)

(52) U.S. Cl.
CPC ..... *H02M 3/33592* (2013.01); *H02M 1/0006* (2021.05); *H02M 1/0048* (2021.05)

(58) Field of Classification Search
CPC .......... H02M 3/33592; H02M 1/0048; H02M 1/0006
See application file for complete search history.

(56) References Cited

U.S. PATENT DOCUMENTS

| | | | | |
|---|---|---|---|---|
| 10,340,802 B1* | 7/2019 | Ke | ............... | H02M 1/34 |
| 10,985,666 B2* | 4/2021 | Xie | ............... | H02M 3/33592 |
| 2002/0021574 A1* | 2/2002 | Ishii | ............... | H02M 3/33592 363/20 |
| 2006/0018133 A1* | 1/2006 | Hua | ............... | H02M 3/33592 363/21.01 |
| 2009/0290391 A1* | 11/2009 | Toccaceli | ........ | H02M 3/33592 363/21.14 |
| 2013/0107582 A1* | 5/2013 | Sato | ............... | H02M 3/33592 363/21.06 |
| 2014/0268915 A1* | 9/2014 | Kong | ............... | H02M 3/33592 363/21.14 |
| 2015/0062972 A1* | 3/2015 | Yang | ............... | H02M 3/33592 363/21.01 |
| 2015/0207414 A1* | 7/2015 | Halberstadt | ....... | H02M 3/33592 363/21.14 |
| 2017/0033703 A1* | 2/2017 | Kikuchi | ............ | H02M 3/33592 |
| 2017/0070151 A1* | 3/2017 | Lin | ............... | H02M 1/36 |

(Continued)

*Primary Examiner* — Gustavo A Rosario-Benitez
(74) *Attorney, Agent, or Firm* — McClure, Qualey & Rodack, LLP

(57) ABSTRACT

A rectifier circuit has a cathode node, an anode node, a rectifier switch, an auxiliary switch, an operating power capacitor and a rectifier controller supplied with power by the operating power capacitor. The rectifier switch is electrically connected to the auxiliary switch. When the rectifier controller turns OFF both the rectifier and auxiliary switches, the rectifier circuit supports a first loop, directing a first current to flow into the rectifier circuit from the anode node, through the operating power capacitor, and away the rectifier circuit from the cathode, so the operating power capacitor is charged. When the rectifier controller turns ON both the rectifier and auxiliary switches, the rectifier circuit supports a second loop directing a second current to flow into the rectifier circuit from the anode node, through the rectifier switch, and away the rectifier circuit from the cathode, without charging the operating power capacitor.

20 Claims, 15 Drawing Sheets

(56) References Cited

U.S. PATENT DOCUMENTS

2017/0207715 A1* 7/2017 Lin .................. H02M 3/33592
2019/0214898 A1* 7/2019 Iorio ................ H02M 3/33592
2020/0083811 A1* 3/2020 Koo .................. H02M 3/3353

* cited by examiner

RECTIFIER CIRCUITS, SYNCHRONOUS RECTIFIER CIRCUITS, AND RELATED ELECTRIC DEVICES

CROSS-REFERENCE TO RELATED APPLICATION

This application claims priority to and the benefit of Taiwan Application Series Number 109118915 filed on Jun. 5, 2020, which is incorporated by reference in its entirety.

BACKGROUND

The present disclosure relates generally to rectifier circuits, and more particularly to rectifier circuits that are capable of building up an operating power voltage supplying power to a rectifier controller inside the rectifier circuits.

Commonly known rectifier devices are diodes mostly, each having two ends: anode and cathode, for directing the current flowing a one-way path from the anode to the cathode, but blocking the current that otherwise flows along the opposite direction.

To make a diode conduct a current, a diode must be forward biased to a certain level. Normally speaking, a diode with a PN junction needs its anode-to-cathode voltage more than a forward voltage, which is about 0.7 volt for example, to conduct current. In view of power devices that supply large current to a load, a diode will constantly consume considerable amount of power because the diode costs constantly 0.7V voltage drop to conduct that large current to the load.

A rectifier switch in company with a rectifier controller has been introduced to replace a diode, for the purpose of synchronous rectification. When the rectifier controller senses that two terminals of the rectifier switch are forward biased, it turns ON the rectifier switch to conduct a current over a channel with very little impedance. In the words, the rectifier switch is turned ON to short the two terminals to each other. When the rectifier controller senses that the two terminals are reversely biased, it turns OFF the rectifier switch to DC isolate the two terminals from each other. The rectifier switch acts as an open circuit between the two terminals if it is turned OFF. A rectifier switch consumes less power during rectification in comparison with a diode, because the rectifier switch needs no forward voltage and the channel of the rectifier switch has very little impedance when it is turned ON.

A rectifier controller needs however an operating power voltage that supplies power to the rectifier controller, so it can work as it is designed to. It is a common practice that a rectifier controller utilizes an output power voltage of a power converter as its own operating power voltage. Nevertheless, the output power voltage of a power converter might be as low as 3.5V, especially when the power converter is a battery charger, and 3.5V is too low to supply power to the rectifier controller, which normally requires its operating power voltage with a minimum of 5V to operate properly.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 5B demonstrates loop LPB that secondary-side current $I_{SEC}$ follows when rectifier switch NSR1 and auxiliary switch NC are turned ON.

FIG. 8B demonstrates loop LPD that secondary-side current $I_{SEC}$ follows when both rectifier switch NSR1 and auxiliary switch NC in FIG. 7 are turned ON.

FIG. 11B demonstrates loop LPF that secondary-side current $I_{SEC}$ follows when rectifier switch NSR1 and auxiliary switch NC in FIG. 10 are turned ON.

FIG. 14B demonstrates loop LPH that secondary-side current $I_{SEC}$ follows when both rectifier switch NSR1 and auxiliary switch NC in FIG. 13 are turned ON.

Figure 1:
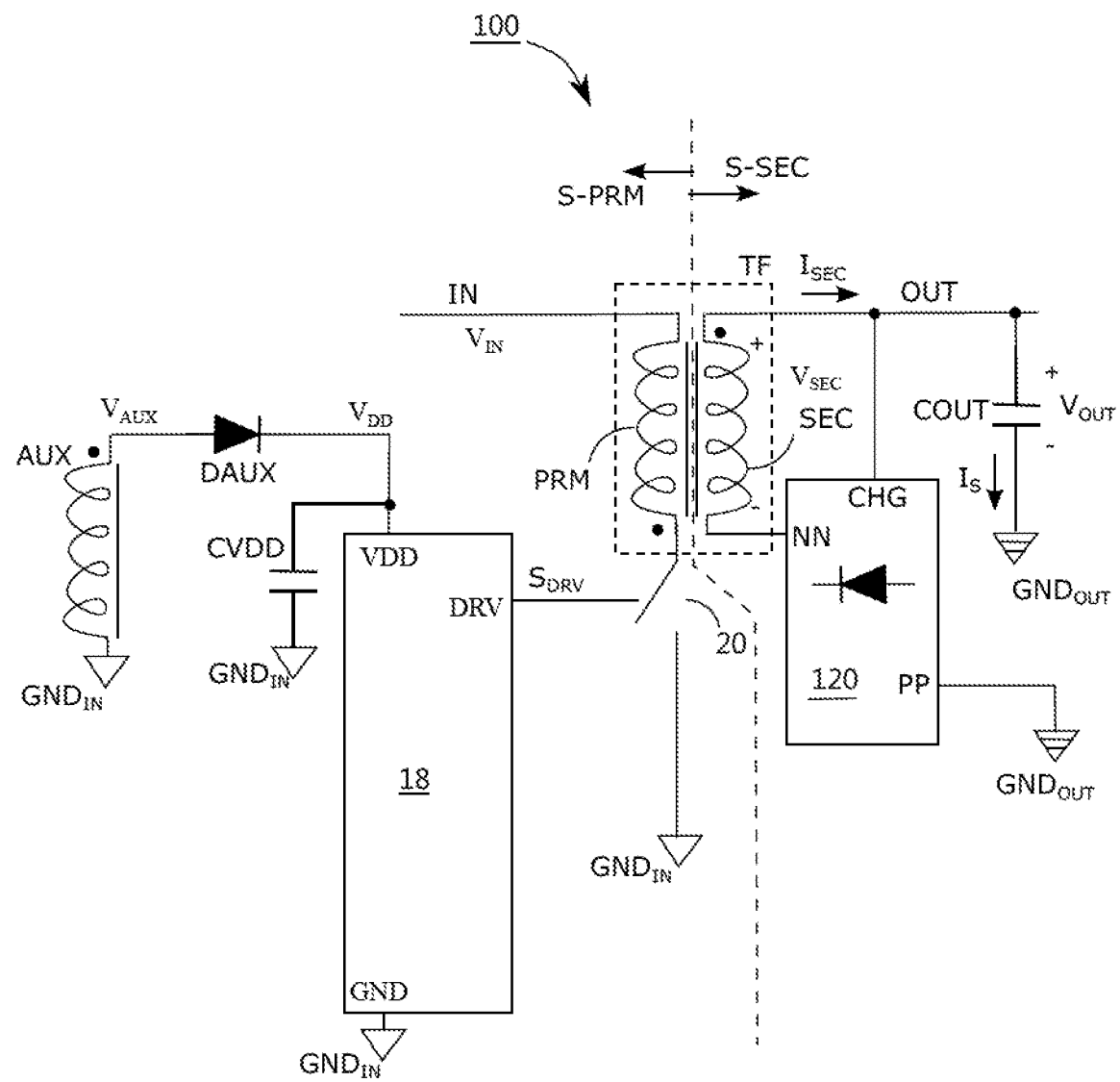
FIG. 1 demonstrates flyback power converter 100 according to embodiments of the invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

According to embodiments of the invention, a rectifier circuit is disclosed, capable of replacing a diode. The rectifier circuit has a cathode node, an anode node, a rectifier switch, an auxiliary switch, an operating power capacitor and a rectifier controller. The rectifier switch is electrically connected to the auxiliary switch. An operating power voltage is across the operating power capacitor to supply power to the rectifier controller. When the rectifier controller turns OFF both the rectifier and auxiliary switches, the rectifier circuit supports a first loop, along which a first current is directed to flow into the rectifier circuit from the anode node, through the operating power capacitor, and away the rectifier circuit from the cathode, so the operating power capacitor is charged. When the rectifier controller turns ON both the rectifier and auxiliary switches, the rectifier circuit supports a second loop, along which a second current is directed to flow into the rectifier circuit from the anode node, through the rectifier switch, and away the rectifier circuit from the cathode, without charging the operating power capacitor.

In case that the rectifier controller determines that the operating power voltage is high enough, the rectifier circuit supports the second loop to perform rectification using the turned-ON rectifier switch with low impedance. When the rectifier controller determines that the operating power voltage is riskily low, it supports the first loop to charge the operating power capacitor and raise the operating power voltage. Please note that the current the rectifier circuit conducts always flows from the anode node to the cathode to provide rectification, no matter the rectifier circuit is supporting the first loop or the second loop.

Embodiments of the invention also provide a power converter with a transformer, a power switch, and a synchronous rectifier circuit. A primary winding of the transformer is in series connected with the power switch between two input power lines. The synchronous rectifier circuit is in series connected with a secondary winding of the transformer between two output power lines. The synchronous rectifier circuit has a rectifier switch, an auxiliary switch, a synchronous rectifier controller, and an operating power capacitor. The synchronous rectifier controller detects a demagnetization time of the transformer during which the transformer is demagnetizing, and accordingly controls the rectifier and auxiliary switches. A portion of the demagnetization time is designated as a charge time, and another a rectification time. During the charge time, the synchronous rectifier controller turns OFF both the rectifier and auxiliary switches, so that a secondary-side current from the secondary winding of the transformer is directed to charge the operating power capacitor, and to build up the operating power voltage across the operating power capacitor. During the rectification time, nevertheless, the synchronous rectifier controller turns ON both the rectifier and auxiliary switches, and the rectifier switch conducts the secondary-side current from the secondary winding without charging the operating power capacitor.

As the transformer is demagnetizing, the energy the transformer is releasing is used to build up the operating power voltage during the charge time. By this way, the operating power voltage could be independently charged, and could not be affected by an over-low output power voltage of the power converter. During the rectification time, the rectifier and auxiliary switches cooperate to perform rectification.

The rectifier switch according to some embodiments of the invention is a N-type MOS transistor having body and source electrically connected to the source and the drain of the auxiliary switch, separately and respectively. The rectifier switch according to other embodiments of the invention is a N-type MOS transistor having both body and source electrically connected to the source of the auxiliary switch.

In this specification, a switch is turned ON when it provides a short circuit with low impedance between two terminals of the switch; and is turned OFF when it provides an open circuit with high impedance between the two terminals.

FIG. 1 demonstrates flyback power converter 100 according to embodiments of the invention, having transformer TF, which includes, but is not limited to include, primary winding PRM, secondary winding SEC, and auxiliary winding AUX, inductively coupling to each other. Transformer TF provides direct-current (DC) isolation between primary side S-PRM and secondary side S-SEC. At primary side S-PRM, flyback power converter 100 has primary winding PRM, power switch 20, power controller 18, auxiliary winding AUX, diode DAUX and operating power capacitor CVDD. At secondary side S-SEC, it has secondary winding SEC, synchronous rectifier circuit 120 and output power capacitor COUT.

It could be understood that input power line IN and input power ground $GND_{IN}$ are two input power lines, which in some embodiments of the invention are two outputs from a bridge rectifier performing full-wave rectification. Input power voltage $V_{IN}$ at input power line IN might be as low as 90V or as high as 240V. Power switch 20 and primary winding PRM are electrically connected in series between input power line IN and input power ground $GND_{IN}$. Synchronous rectifier circuit 120 and secondary winding SEC are electrically connected in series between output power line OUT and output power ground $GND_{OUT}$, while output power capacitor COUT has two ends connected to output power line OUT and output power ground $GND_{OUT}$, respectively.

Power controller 18 generates PWM signal $S_{DRV}$ to turn ON and OFF power switch 20. When power switch 20 is turned ON, input power voltage $V_{IN}$ energizes primary winding PRM, increasing the amplitude of its magnetic field therein. When power switch 20 is turned OFF, transformer TF demagnetizes, releasing the energy it has stored to output power capacitor COUT and/or operating power capacitor CVDD via secondary winding SEC and/or auxiliary winding by way of the rectification provided by rectifier circuit 120 and/or diode DAUX. This period of time when transformer TF demagnetizes to release energy is named demagnetization time TDEG. Output power voltage $V_{OUT}$ across output power capacitor COUT is for supplying power to a load not shown in FIG. 1, while operating power voltage $V_{DD}$ across operating power capacitor CVDD is for supplying power to power controller 18. Output power voltage $V_{OUT}$ might be monitored by an error amplifier to signal, via a photo coupler for example, power controller 18, which accordingly adjusts the ON time of power switch 20, so as to regulate output power voltage $V_{OUT}$.

Synchronous rectifier circuit 120 has anode node PP, cathode node NN, and charge node CHG, capable of providing rectification between anode node PP and cathode node NN. In other words, when the voltage at anode node PP is higher than that at cathode node NN, synchronous rectifier circuit 120 could provide a short circuit connecting anode node PP and cathode node NN, and if the voltage at anode node PP is lower than that at cathode node NN it provides an open circuit separating anode node PP from cathode node NN. It is shown in FIG. 1 that anode node PP is electrically connected to output power ground $GND_{OUT}$, cathode node NN to secondary winding SEC, and charge node CHG to output power line OUT.

Figure 2:
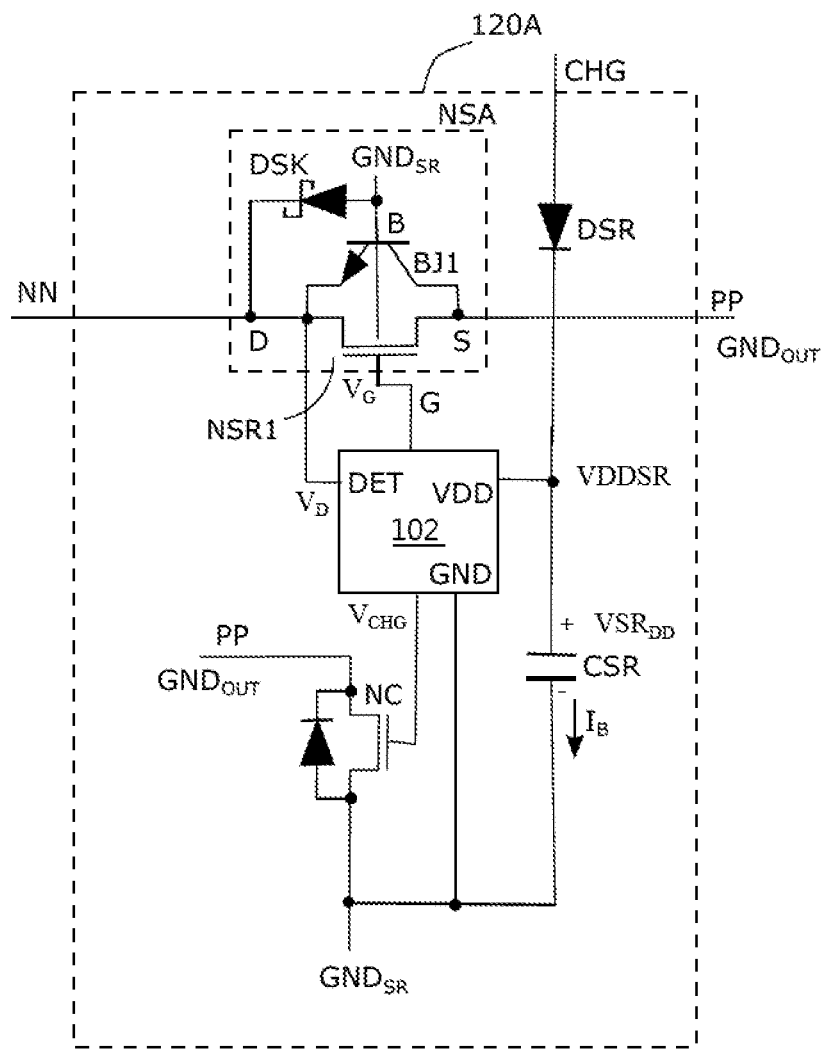
FIG. 2 shows synchronous rectifier circuit 120A.

FIG. 2 shows synchronous rectifier circuit 120A, an example of synchronous rectifier circuit 120. Synchronous rectifier circuit 120A has rectifier switch NSR1, auxiliary switch NC, rectifier controller 102, operating power capacitor CSR, diode DSR, and schottky barrier diode DSK, connection of which is demonstrated in FIG. 2.

Rectifier switch NSR1 shown in FIG. 2 is an N-type MOS transistor with drain D, body B, source S and gate G. It is understood that body B in FIG. 2 does not short to source S, so the body voltage at body B could be different from the source voltage at source S. Parasitic inside rectifier switch NSR1 is bipolar junction transistor BJ1 with an emitter, a base and a collector electrically connected to drain D, body B and source S of rectifier switch NSR1, respectively. The anode and the cathode of schottky barrier diode DSK are connected to body B and drain D respectively. Schottky barrier diode DSK is used to clamp the body-to-drain voltage between body B and drain D, making it less than 0.5V, so that bipolar junction transistor BJ1 cannot work under an active mode and the source voltage at source S could be DC isolated from drain voltage $V_D$ at drain D. Otherwise, if the body-to-drain voltage is more than 0.7V, then bipolar junction transistor BJ1 could operate at an active mode, and it would strongly pull the source voltage at source S and drain voltage $V_D$ at drain D close to each other.

Across operating power capacitor CSR is operating power voltage $VSR_{DD}$. As shown in FIG. 2, connected between power line VDDSR and virtual ground $GND_{SR}$ is operating power capacitor CSR, supplying the power that synchronous rectifier controller 102 needs for normal operation. The voltage at virtual ground $GND_{SR}$ is deemed to be 0V, a ground voltage, that synchronous rectifier controller 102 references for processing signals.

Drain D of rectifier switch NSR1 is connected to cathode node NN, source S to anode node PP, and body B to virtual ground $GND_{SR}$. Auxiliary switch NC has drain and source respectively connected to anode node PP and virtual ground $GND_{SR}$, capable of optionally shorting anode node PP to virtual ground $GND_{SR}$. Diode DSR is between charge node CHG and power line VDDSR, for directing current to charge operating power capacitor CSR if diode DSR is forward biased. Rectifier controller 102 detects drain voltage $V_D$ at drain D of rectifier switch NSR1, to responsively generate signals $V_G$ and $V_{CHG}$ controlling rectifier switch NSR1 and auxiliary switch NC respectively.

Figure 3:
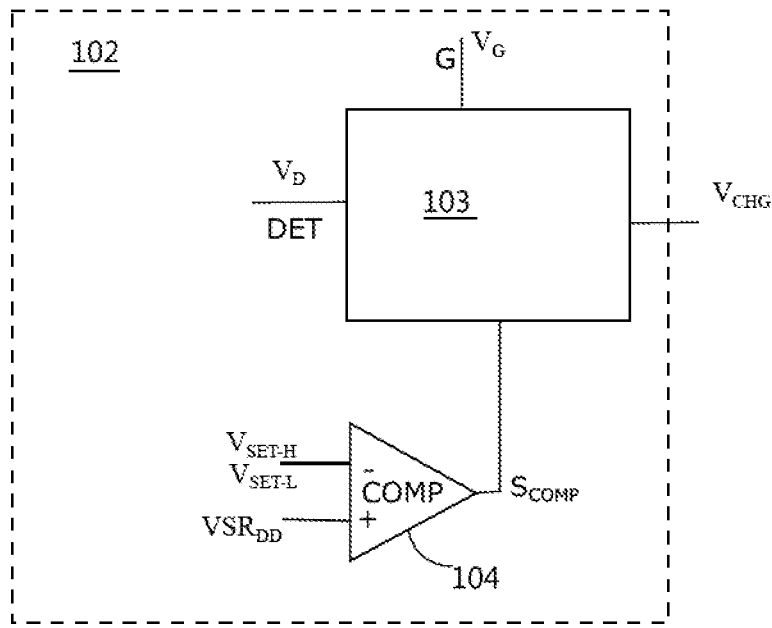
FIG. 3 demonstrates synchronous rectifier controller 102 in FIG. 2.
Figure 4:
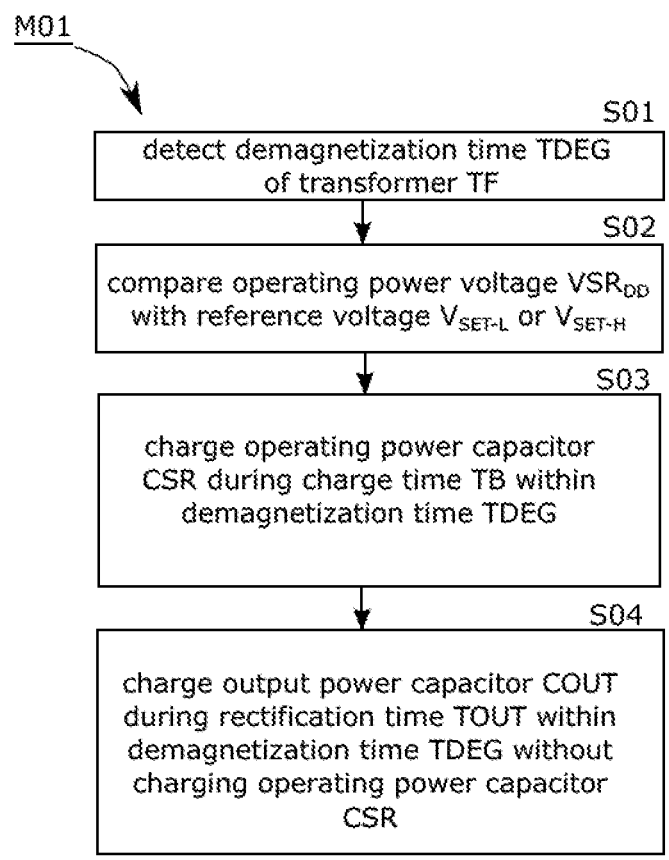
FIG. 4 shows control method M01 in use of synchronous rectifier circuit 120A.

FIG. 3 demonstrates synchronous rectifier controller 102, and FIG. 4 shows control method M01 in use of synchronous rectifier circuit 120A. Synchronous rectifier controller 102 includes, but is not limited to include, demagnetization detector 103 and comparator 104.

In step S01 of control method M01, demagnetization detector 103 in FIG. 3 detects whether transformer TF is demagnetizing, by sensing drain voltage $V_D$ at detection node DET. According to some embodiments of the invention, demagnetization detector 103 deems transformer TF as being demagnetizing or the current moment being within demagnetization time TDEG if drain voltage $V_D$ is less than the virtual ground voltage at virtual ground $GND_{SR}$. In the opposite, if drain voltage $V_D$ becomes larger than the virtual ground voltage at virtual ground $GND_{SR}$, demagnetization detector 103 deems the demagnetization of transformer TF stops, demagnetization time TDEG being concluded. Depending on the determination whether the present moment is within or outside demagnetization time TDEG, in together with the comparison result from comparator 104, demagnetization detector 103 provides signals $V_G$ and $V_{CHG}$. During demagnetization time TDEG, the electrical energy stored by transformer TF is released to the secondary side, demagnetizing, and secondary-side current $I_{SEC}$ from secondary winding SEC charges output power capacitor COUT and/or operating power capacitor CSR.

In step S02, comparator 104 in FIG. 3 checks if operating power voltage $VSR_{DD}$ is over low that synchronous rectifier controller 102 is possibly going to fail if operating power voltage $VSR_{DD}$ continues decreasing. Comparator 104, having hysteresis, compares operating power voltage $VSR_{DD}$ with reference voltage $V_{SET-H}$ or $V_{SET-L}$. Only when operating power voltage $VSR_{DD}$ rises above reference voltage $V_{SET-H}$, 10V for instance, then comparator 104 has its output $S_{COMP}$ become "1" in logic, meaning that operating power voltage $VSR_{DD}$ is good and healthy. Only when operating power voltage $VSR_{DD}$ drops below reference voltage $V_{SET-L}$, 5.5V for instance, then comparator 104 has its output $S_{COMP}$ become "0" in logic, meaning that operating power voltage $VSR_{DD}$ is over low, or at risk.

Figure 5A:
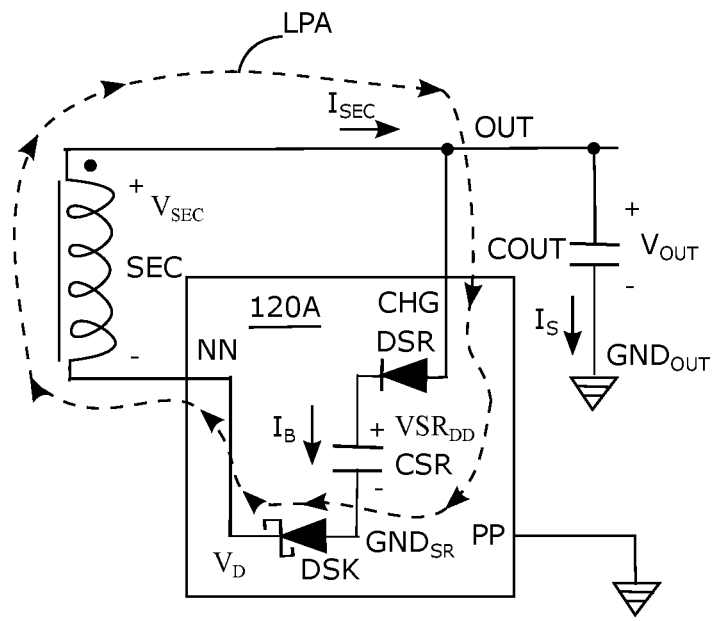
FIG. 5A demonstrates loop LPA that secondary-side current $I_{SEC}$ follows when rectifier switch NSR1 and auxiliary switch NC are turned OFF.

In step S03, demagnetization detector 103 assigns a portion of demagnetization time TDEG to be charge time TB, during which secondary-side current $I_{SEC}$, the current induced due to demagnetization, is directed to charge operating power capacitor CSR. For example, if output $S_{COMP}$ is "0" in logic, implying the risk of over-low operating power voltage $VSR_{DD}$, demagnetization detector 103 takes a beginning portion of demagnetization time TDEG as charge time TB, during which demagnetization detector 103 turns OFF both rectifier switch NSR1 and auxiliary switch NC, using signals $V_G$ and $V_{CHG}$. FIG. 5A demonstrates loop LPA that secondary-side current $I_{SEC}$ follows when rectifier switch NSR1 and auxiliary switch NC are turned OFF during charge time TB. Synchronous rectifier circuit 120A supports to form loop LPA providing a charge path for powering operating power capacitor CSR. Following loop LPA, secondary-side current $I_{SEC}$ starts from secondary winding SEC, goes inside synchronous rectifier circuit 120A via charge node CHG, passes through diode DSR, charges operating power capacitor CRS, passes schottky barrier diode DSK, leaves away synchronous rectifier circuit 120A via cathode node NN, and eventually returns to secondary winding SEC.

Figure 5B:
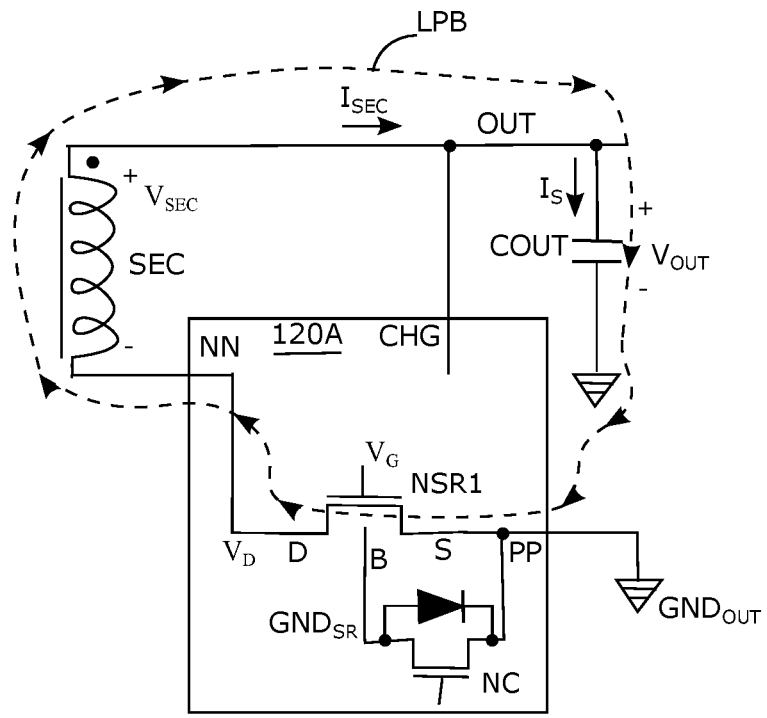

In step S04 in FIG. 4, demagnetization detector 103 assigns another portion of demagnetization time TDEG to be rectification time TOUT, during which secondary-side current $I_{SEC}$ is directed to charge output power capacitor COUT, without charging operating power capacitor CRS. According to some embodiments of the invention, demagnetization detector 103 takes the rest of demagnetization time TDEG after the end of charge time TB as rectification time TOUT, during which demagnetization detector 103 turns ON both rectifier switch NSR1 and auxiliary switch NC, using signals $V_G$ and $V_{CHG}$. FIG. 5B demonstrates loop LPB that secondary-side current $I_{SEC}$ follows when rectifier switch NSR1 and auxiliary switch NC are turned ON during rectification time TOUT. Loop LPB provides a charge path for charging output power capacitor COUT. Following loop LPB, secondary-side current $I_{SEC}$ starts from secondary winding SEC, charges output power capacitor COUT, goes inside synchronous rectifier circuit 120A via anode node PP, passes through rectifier switch NSR1, leaves away synchronous rectifier circuit 120A via cathode node NN, and eventually returns to secondary winding SEC. In FIG. 5B, body B and source S of rectifier switch NSR1 short to each other because auxiliary switch NC is turned ON. It is also demonstrated in FIG. 5B that secondary-side current $I_{SEC}$ does not go through auxiliary switch NC, even though auxiliary switch NC is turned ON.

Figure 6A:
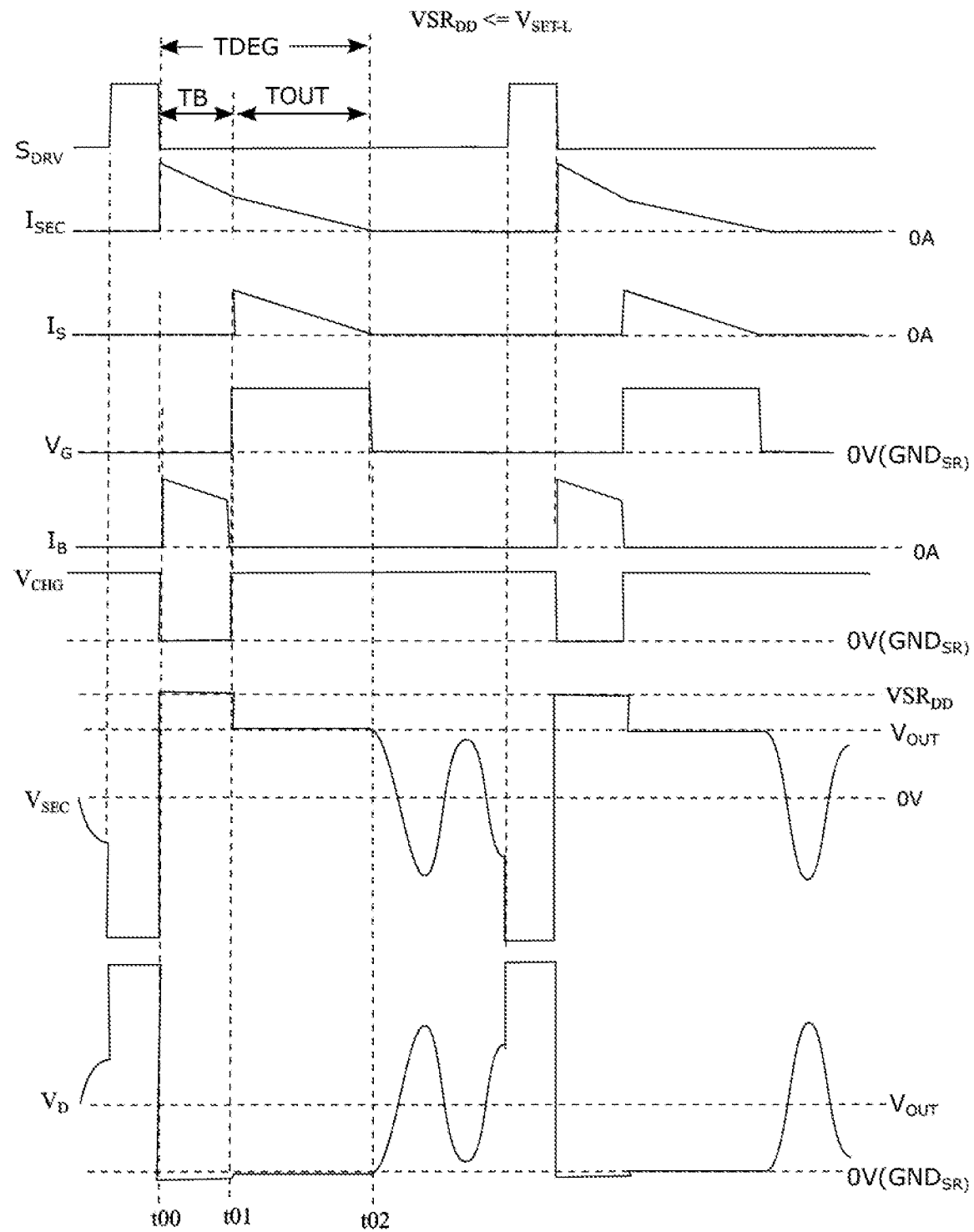
FIG. 6A shows waveforms of signals in FIGS. 5A and 5B when operating power voltage $VSR_{DD}$ is deemed over low, or operating power voltage $VSR_{DD}$ is less than reference voltage $V_{SET-L}$.

FIG. 6A shows waveforms of signals in FIGS. 5A and 5B when operating power voltage $VSR_{DD}$ is deemed over low, or operating power voltage $VSR_{DD}$ is less than reference voltage $V_{SET-L}$. From top to bottom, the waveforms in FIG. 6A are of PWM signal $S_{DRV}$ controlling power switch 20 at primary side S-PRM, secondary-side current $I_{SEC}$ from secondary winding SEC, current $I_S$ charging output power capacitor COUT, signal $V_G$ controlling rectifier switch NSR1, current $I_B$ charging operating power capacitor CSR, signal $V_{CHG}$ controlling auxiliary switch NC, voltage $V_{SEC}$ across secondary winding SEC, and drain voltage $V_D$ at drain D of rectifier switch NSR1, respectively.

At moment t00 in FIG. 6A, since drain voltage $V_D$ abruptly drops to become negative, demagnetization detector 103 determines transformer TF is demagnetizing, and moment t00 is the beginning of demagnetization time TDEG.

The example shown in FIG. 6A has charge time TB and demagnetization time TDEG start at the same time. During charge time TB, demagnetization detector 103 uses signals $V_G$ and $V_{CHG}$ to turn OFF both rectifier switch NSR1 and auxiliary switch NC. As demonstrated in FIG. 6A, during charge time TB, from moment t00 to moment t01, operating power capacitor CSR is charged because current $I_B$ is positive, and output power capacitor COUT is not charged because current $I_S$ is zero. It is also shown in FIG. 6A that during charge time TB voltage $V_{SEC}$ across secondary winding SEC equals to about operating power voltage $VSR_{DD}$ across operating power capacitor CSR.

The example shown in FIG. 6A demonstrates that rectification time TOUT follows right after charge time TB, and ends with the end of demagnetization time TDEG. According to embodiments of the invention, demagnetization detector 103 determines demagnetization time TDEG comes to an end at the time when drain voltage $V_D$ becomes positive.

During rectification time TOUT, demagnetization detector 103 uses signals $V_G$ and $V_{CHG}$ to turn ON both rectifier switch NSR1 and auxiliary switch NC. As demonstrated in FIG. 6A, during rectification time TOUT, from moment t01 to moment t02, operating power capacitor CSR is not charged because current $I_B$ is zero, and output power capacitor COUT is charged because current $I_S$ is positive. Therefore, it is also shown in FIG. 6A that during rectification time TOUT voltage $V_{SEC}$ across secondary winding SEC equals to about output power voltage $V_{OUT}$ across output power capacitor COUT.

The example in FIG. 6A has rectifier switch NSR1 turned ON only during rectification time TOUT to perform rectification, while auxiliary switch NC is always turned ON except the duration of charge time TB. When auxiliary switch NC is ON, virtual ground $GND_{SR}$ is considered as being shorted to output power ground $GND_{OUT}$, so virtual ground $GND_{SR}$ and output power ground $GND_{OUT}$ are substantially the same ground. In other words, virtual ground $GND_{SR}$ is DC isolated from output power ground $GND_{OUT}$ only during charge time TB, to let operating power capacitor CSR being charged.

Figure 6B:
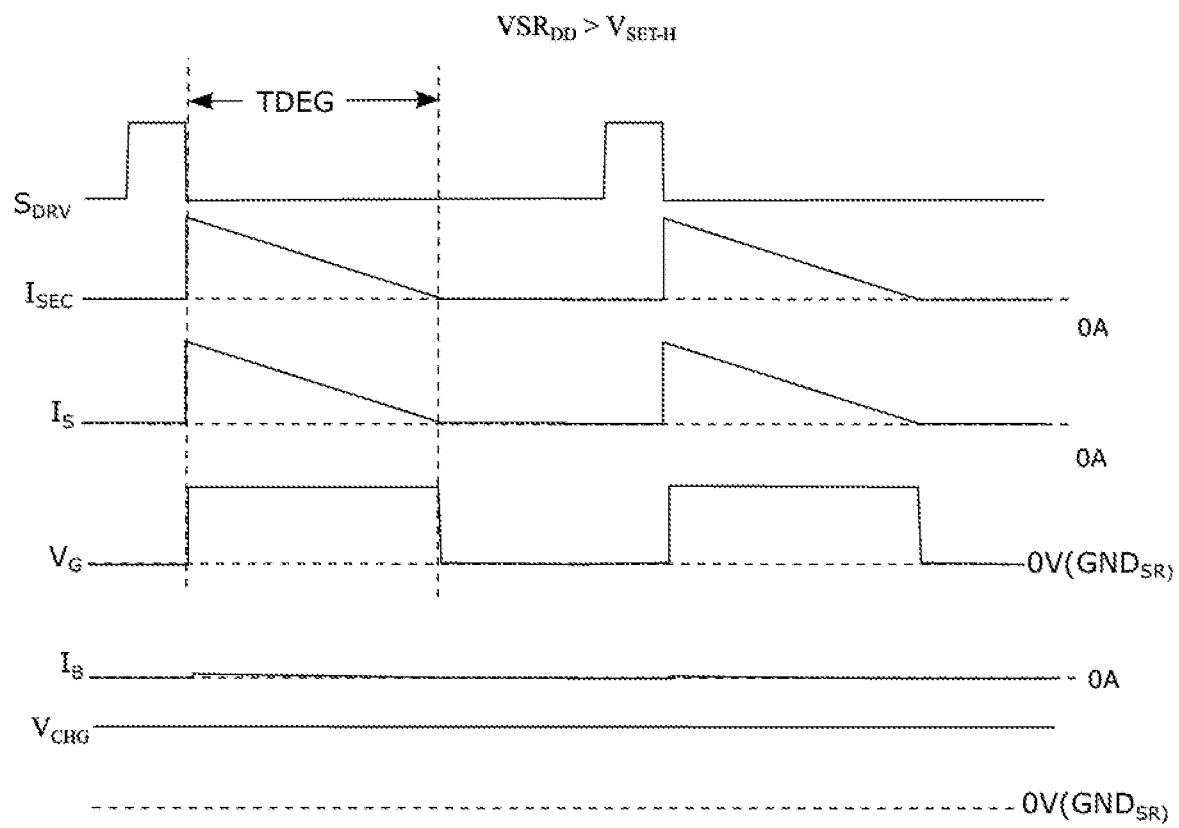
FIG. 6B shows waveforms of signals in FIG. 5B when operating power voltage $VSR_{DD}$ is good enough, or operating power voltage $VSR_{DD}$ is higher than reference voltage $V_{SET-H}$.

FIG. 6B shows waveforms of signals in FIG. 5B when operating power voltage $VSR_{DD}$ is good enough, or operating power voltage $VSR_{DD}$ is higher than reference voltage $V_{SET-H}$. From top to bottom, the waveforms in FIG. 6B are of PWM signal $S_{DRV}$, secondary-side current $I_{SEC}$, current $I_S$ charging output power capacitor COUT, signal $V_G$ controlling rectifier switch NSR1, current $I_B$ charging operating power capacitor CSR, and signal $V_{CHG}$ controlling auxiliary switch NC, respectively. Simply speaking, as long as operating power voltage $VSR_{DD}$ is good enough, operating power capacitor CSR need not be charged, and the whole demagnetization time TDEG is only used for synchronous rectification. It can be observed in the embodiment of FIG. 6B that auxiliary switch NC is turned ON at all time to short virtual ground $GND_{SR}$ to output power ground $GND_{OUT}$, and that rectifier switch NSR1 is only turned on during demagnetization time TDEG. In FIG. 6B rectification time TOUT is the same with demagnetization time TDEG.

It is merely a design choice that charge time TB and demagnetization time TDEG in FIG. 6A begin at the same time, and is not intended to limit the scope of the invention. Charge time TB could be any portion of demagnetization time TDEG. According to an embodiment of the invention, rectification time TOUT and demagnetization time TDEG start at the same time, charge time TB starts when rectification time TOUT ends, and both charge time TB and demagnetization time TDEG end together.

Some embodiments of the invention could have more than one charge time TB within one demagnetization time TDEG. For example, first charge time TB1 and demagnetization time TDEG start at the same time. Rectification time TOUT follows the end of first charge time TB1. Second charge time TB2 starts after the end of rectification time TOUT, and ends at the same time when demagnetization time TDEG ends.

According to embodiments of the invention, output power voltage $V_{OUT}$ could be as low as 3.5V, and operating power voltage $VSR_{DD}$ is maintained to be more than 5.5V. Power conversion efficiency for maintaining operating power voltage $VSR_{DD}$ will be superior because it is built up using the energy released from demagnetization of transformer TF.

An embodiment of the invention allows output power voltage $V_{OUT}$ being regulated at any voltage within the range from 3.5V to 20V, while operating power voltage $VSR_{DD}$ is maintained to be more than 5.5V. It implies that voltage $V_{SEC}$ across secondary winding SEC has maximums ranging from 5.5V to 20V, about a 4-fold voltage variation range (~20/5.5), and this will inductively build up operating power voltage $V_{DD}$, that supplies power to power controller 18 in FIG. 1, to vary about within another 4-fold voltage variation range. In case that power controller 18 requires operating power voltage $V_{DD}$ to have a minimum of 10V, power pin VDD of power controller 18 of this embodiment might beneficially need to tolerate a voltage as low as 40V.

According to embodiments of the invention, synchronous rectifier circuit 120 also monitors output power voltage $V_{OUT}$, and allocates a portion of demagnetization time TDEG to be charge time TB if operating power voltage $VSR_{DD}$ is less than the summation of a predetermined voltage and output power voltage $V_{OUT}$. For example, synchronous rectifier circuit 120 starts to introduce charge time TB into demagnetization time TDEG if operating power voltage $VSR_{DD}$ is not 5V higher than output power voltage $V_{OUT}$. In other words, synchronous rectifier circuit 120 keeps operating power voltage $VSR_{DD}$ a predetermined voltage higher than output power voltage $V_{OUT}$. According to embodiments of the invention, reference voltage $V_{SET-L}$ in FIG. 3 is about the summation of 5.5V and output power voltage $V_{OUT}$, and reference voltage $V_{SET-H}$ is about the summation of 6V and output power voltage $V_{OUT}$.

Figure 7:
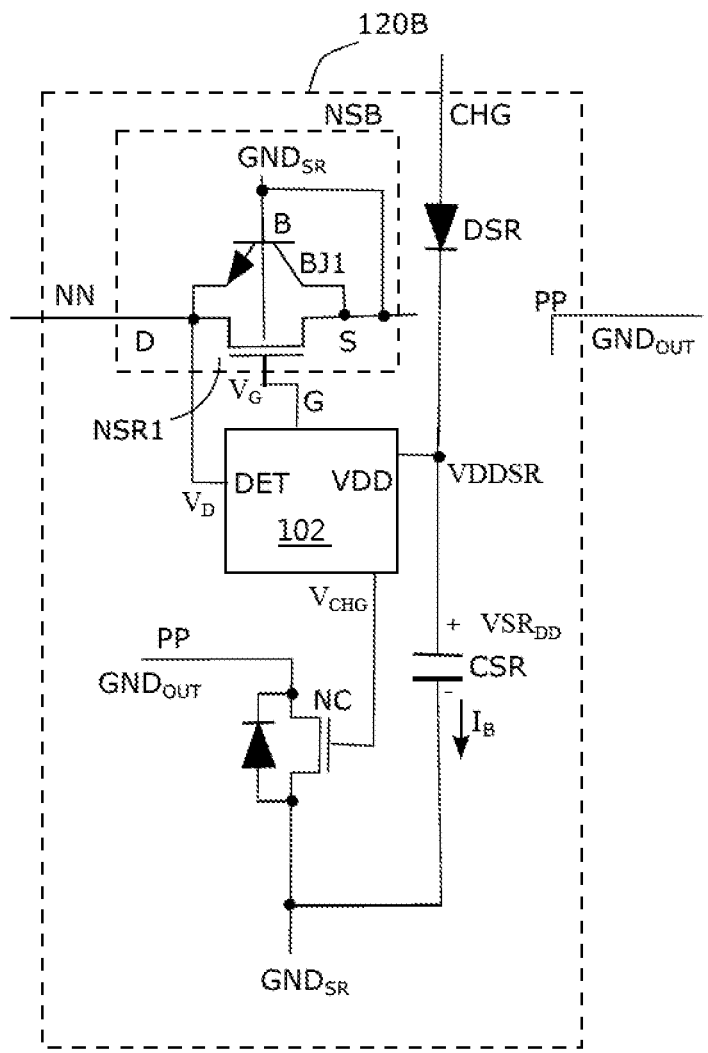
FIG. 7 demonstrates synchronous rectifier circuit 120B, an example of synchronous rectifier circuit 120.

FIG. 7 demonstrates synchronous rectifier circuit 120B, an example of synchronous rectifier circuit 120. Synchronous rectifier circuit 120B has rectifier switch NSR1, auxiliary switch NC, synchronous rectifier controller 102, operating power capacitor CSR and diode DSR, connection of which is shown in FIG. 7. Some aspects in FIGS. 7 and 2 are similar or in common, and explanation of these aspects are omitted because they could be comprehensible in view of the teachings regarding to FIG. 2. Even though FIG. 7 lacks schottky barrier diode DSK in FIG. 2, it might as well include schottky barrier diode DSK connected between body B and drain D of rectifier switch NSR1 in another embodiment of the invention. In synchronous rectifier circuit 120B of FIG. 7, body B and source S of rectifier switch NSR1 short to each other, both connected to virtual ground $GND_{SR}$, which is also connected to the source of auxiliary switch NC. The drain of auxiliary switch NC is connected to anode node PP, which is connected to output power ground $GND_{OUT}$.

Both synchronous rectifier controller 102 in FIG. 3 and control method M01 in FIG. 4 are applicable to synchronous rectifier circuit 120B of FIG. 7.

Figure 8A:
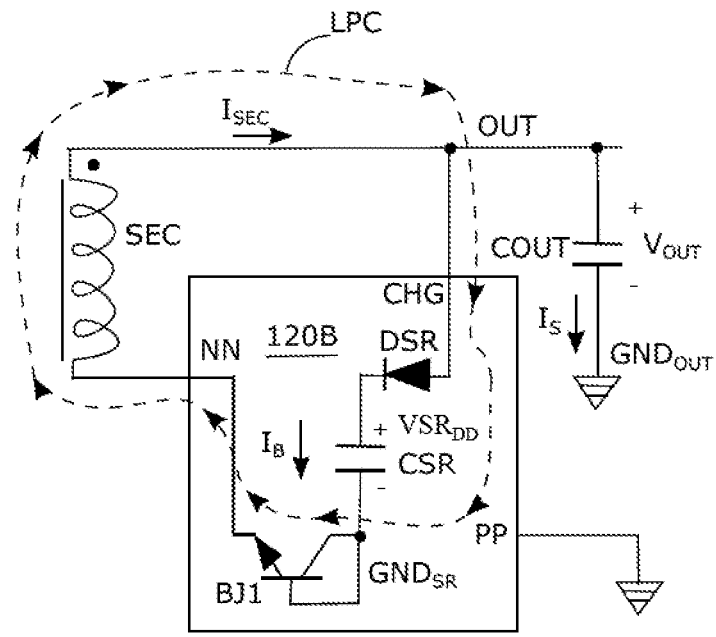
FIG. 8A demonstrates loop LPC that secondary-side current $I_{SEC}$ follows when both rectifier switch NSR1 and auxiliary switch NC in FIG. 7 are turned OFF.

FIG. 8A demonstrates loop LPC that secondary-side current $I_{SEC}$ follows when both rectifier switch NSR1 and auxiliary switch NC in FIG. 7 are turned OFF during demagnetization time TDEG. Loop LPC provides a charge path for powering operating power capacitor CSR. Following loop LPC, secondary-side current $I_{SEC}$ starts from secondary winding SEC, goes inside synchronous rectifier circuit 120B via charge node CHG, passes through diode DSR, charges operating power capacitor CRS, goes through bipolar junction transistor BJ1, leaves away synchronous rectifier circuit 120B via cathode node NN, and eventually returns to secondary winding SEC. Loop LPC is also applicable when rectifier switch NSR1 in FIG. 7 is turned ON and auxiliary switch NC is turned OFF, only if bipolar junction transistor BJ1 is replaced with turned-ON rectifier switch NSR1. In other words, to provide loop LPC, auxiliary switch NC in FIG. 7 is turned OFF during demagnetization time TDEG no matter rectifier switch NSR1 is turned ON or OFF.

Figure 8B:
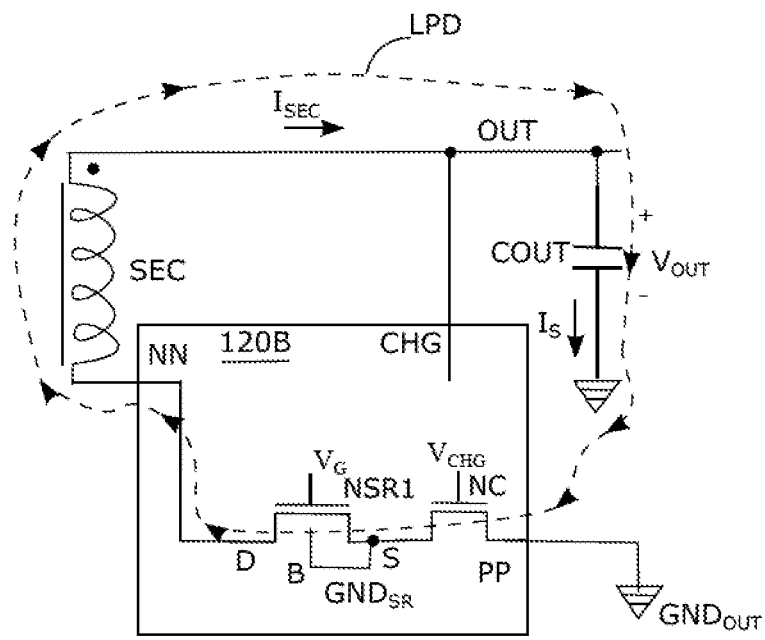

FIG. 8B demonstrates loop LPD that secondary-side current $I_{SEC}$ follows when both rectifier switch NSR1 and auxiliary switch NC in FIG. 7 are turned ON during demagnetization time TDEG. Loop LPD provides a charge path for powering output power capacitor COUT. Following loop LPD, secondary-side current $I_{SEC}$ starts from secondary winding SEC, charges output power capacitor COUT, goes inside synchronous rectifier circuit 120B via output power ground $GND_{OUT}$ and anode node PP, passes through both auxiliary switch NC and rectifier switch NSR1, leaves away synchronous rectifier circuit 120B via cathode node NN, and eventually returns to secondary winding SEC.

The waveforms in FIGS. 6A and 6B are also applicable for explaining the operation of synchronous rectifier circuit 120B. Persons skilled in the art could understand the operation of synchronous rectifier circuit 120B based on the aforementioned teaching with regard to FIGS. 6A, 6B, 7, 8A and 8B.

Figure 9:
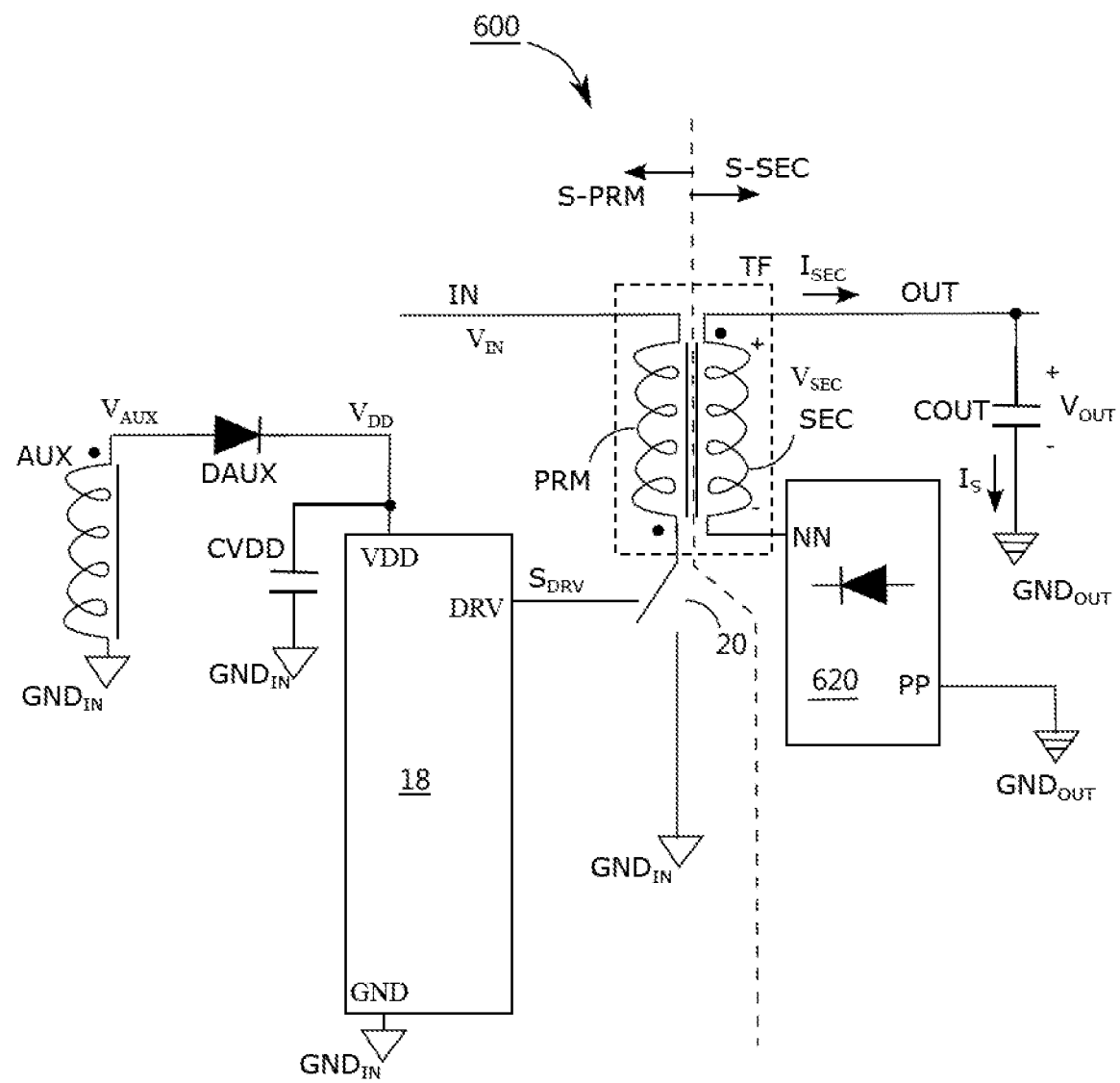
FIG. 9 illustrates flyback power converter 600 according to embodiments of the invention.

FIG. 9 illustrates flyback power converter 600 according to embodiments of the invention. Similar or the same aspects between flyback power converter 600 in FIG. 9 and flyback power converter 100 in FIG. 1 are not detailed herein because they are comprehensible based on the aforementioned teaching. Different from FIG. 1, synchronous rectifier circuit 620 in FIG. 9 lacks charge node CHG, through which synchronous rectifier circuit 120 in FIG. 1 is connected to output power line OUT.

Even though synchronous rectifier circuit 620 in FIG. 9 is connected between output power ground $GND_{OUT}$ and secondary winding SEC, but this invention is not limited to. Another embodiment of the invention, for example, could have anode node PP of synchronous rectifier circuit 620 connected to secondary winding SEC and cathode node NN connected to output power line OUT while output power ground $GND_{OUT}$ shorts to secondary winding SEC.

Synchronous rectifier circuit 620 in FIG. 9 has, but is not limited to have, only two terminals. It is possible for synchronous rectifier circuit 620 to replace a conventional diode according to embodiments of the invention.

Figure 10:
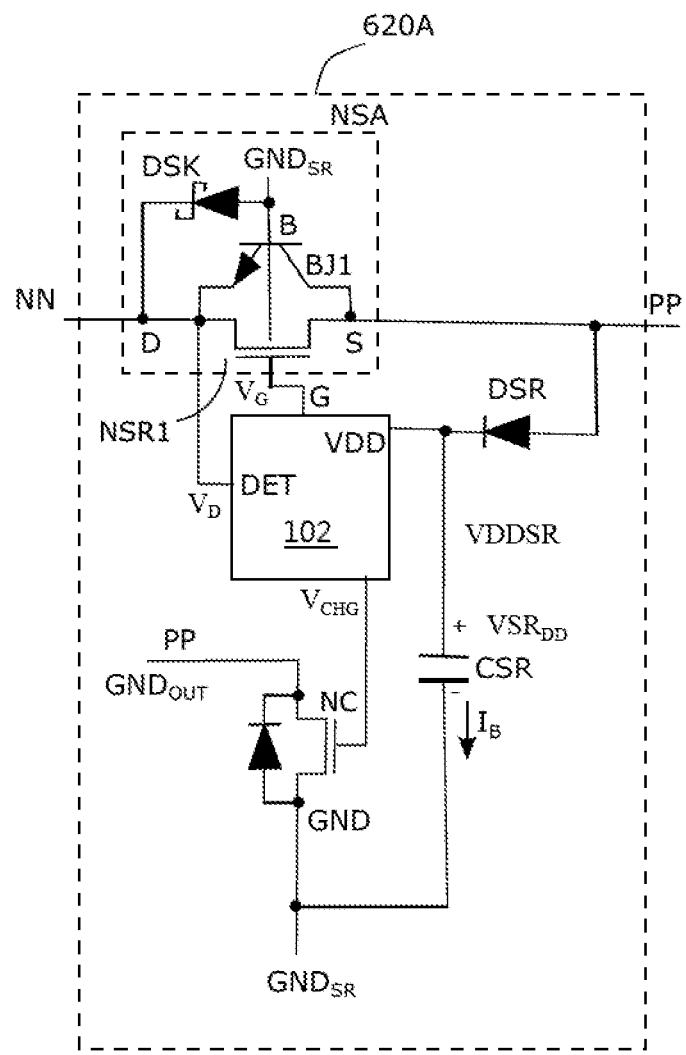
FIG. 10 shows synchronous rectifier circuit 620A, an example of synchronous rectifier circuit 620 in FIG. 9.

FIG. 10 shows synchronous rectifier circuit 620A, an example of synchronous rectifier circuit 620 in FIG. 9. Similar or the same aspects between synchronous rectifier circuit 620A in FIG. 10 and synchronous rectifier circuit 120A in FIG. 2 are not detailed herein because they are comprehensible based on the aforementioned teaching. Diode DSR in FIG. 10, different from the corresponding one in FIG. 2, is connected between anode node PP and operating power capacitor CSR.

Figure 11A:
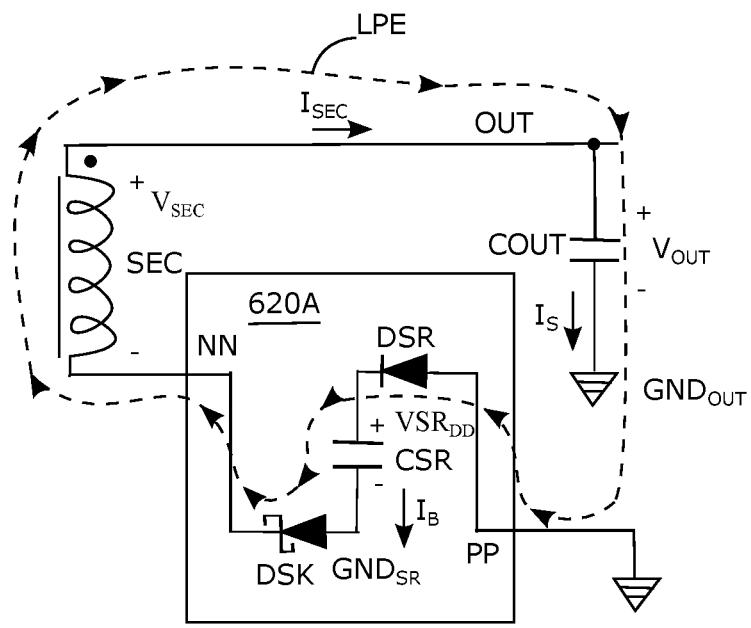
FIG. 11A demonstrates loop LPE that secondary-side current $I_{SEC}$ follows when rectifier switch NSR1 and auxiliary switch NC in FIG. 10 are turned OFF.

FIG. 11A demonstrates loop LPE that secondary-side current $I_{SEC}$, which is positive during demagnetization time TDEG, follows when both rectifier switch NSR1 and auxiliary switch NC in FIG. 10 are turned OFF during charge time TB. Loop LPE provides a charge path for charging both operating power capacitor CSR and output power capacitor COUT. Following loop LPE, secondary-side current $I_{SEC}$ starts from secondary winding SEC, charges output power capacitor COUT via output power line OUT and output power ground $GND_{OUT}$, goes inside synchronous rectifier circuit 620A via anode node PP, passes through diode DSR, charges operating power capacitor CSR, passes through schottky barrier diode DSK, leaves away synchronous rectifier circuit 620A via cathode node NN, and eventually returns to secondary winding SEC.

Figure 11B:
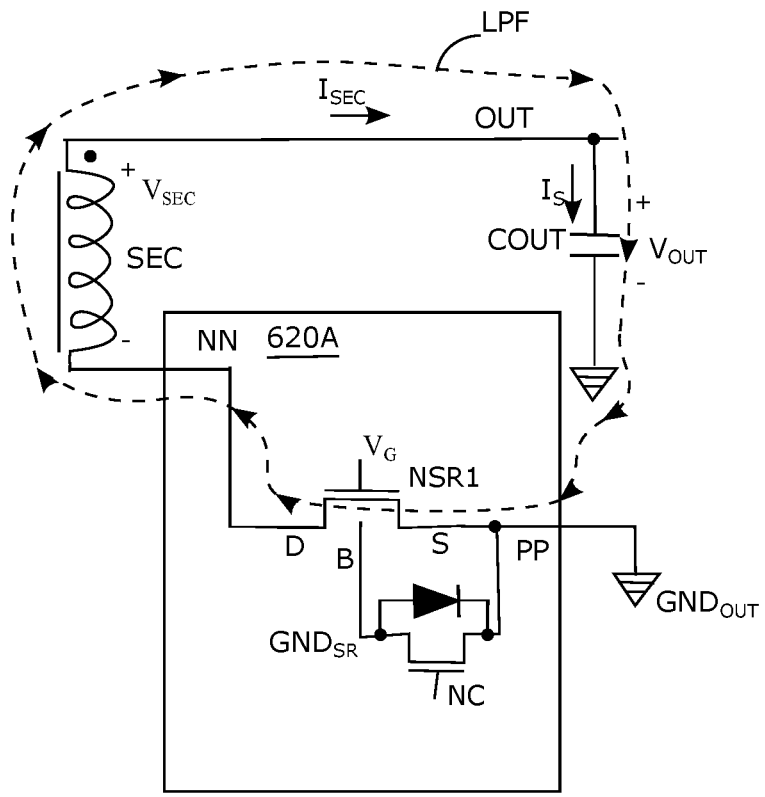

FIG. 11B demonstrates loop LPF that secondary-side current $I_{SEC}$ follows when both rectifier switch NSR1 and auxiliary switch NC in FIG. 10 are turned ON during demagnetization time TDEG. Loop LPF provides a charge path not charging operating power capacitor CRS. Following loop LPF, secondary-side current $I_{SEC}$ starts from secondary winding SEC, charges output power capacitor COUT via output power line OUT and output power ground $GND_{OUT}$, goes inside synchronous rectifier circuit 620A via anode node PP, passes through rectifier switch NSR1, leaves away synchronous rectifier circuit 620A via cathode node NN, and eventually returns to secondary winding SEC. In FIG. 11B, body B and source S of rectifier switch NSR1 short to each other because auxiliary switch NC is turned ON. It is also demonstrated in FIG. 11B that secondary-side current $I_{SEC}$ does not go through auxiliary switch NC, even though auxiliary switch NC is turned ON. It is also shown in FIG. 11B that, during demagnetization time TDEG, output power capacitor COUT is charged, but operating power capacitor CRS is not.

Figure 12:
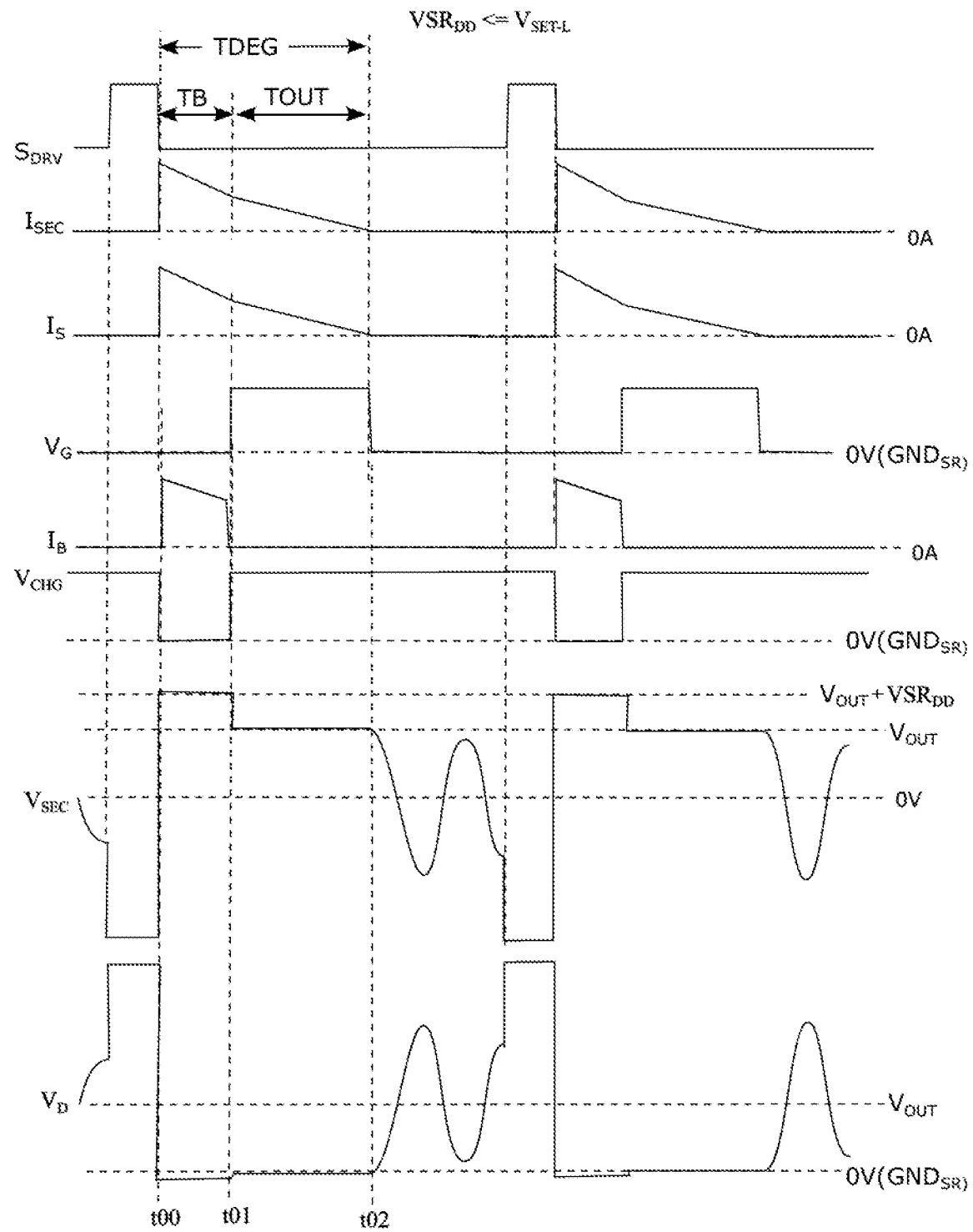
FIG. 12 shows waveforms of signals in FIGS. 11A and 11B when operating power voltage $VSR_{DD}$ is deemed over low, or operating power voltage $VSR_{DD}$ is less than reference voltage $V_{SET-L}$.

FIG. 12 shows waveforms of signals in FIGS. 11A and 11B when operating power voltage $VSR_{DD}$ is deemed over low, or operating power voltage $VSR_{DD}$ is less than reference voltage $V_{SET-L}$. Similar or the same aspects between FIG. 12 and FIG. 6A are not detailed herein because they are comprehensible based on the aforementioned teaching.

FIG. 12, unlike FIG. 6A, shows the waveform of secondary-side current $I_{SEC}$ the same with that of current $I_S$. It is because both loops LPE and LPF pass through output power capacitor COUT, as indicated in FIGS. 11A and 11B. In other words, secondary-side current $I_{SEC}$, if positive, always goes through output power capacitor COUT no matter the present moment is within charge time TB or rectification time TOUT.

Furthermore, FIG. 12, unlike FIG. 6A, demonstrates that voltage $V_{SEC}$ across secondary winding SEC is about the summation of operating power voltage $VSR_{DD}$ and output power voltage $V_{OUT}$ during charge time TB. It is because output power capacitor COUT and operating power capacitor CSR are equivalently connected in series to be charged during charge time TB.

It is merely a design choice that charge time TB and demagnetization time TDEG in FIG. 12 begin at the same time, and is not intended to limit the scope of the invention. Charge time TB could be any portion of demagnetization time TDEG. According to an embodiment of the invention, rectification time TOUT and demagnetization time TDEG start at the same time, charge time TB starts when rectification time TOUT ends, and both charge time TB and demagnetization time TDEG end together.

Some embodiments of the invention could have more than one charge time TB within one demagnetization time TDEG. For example, first charge time TB1 and demagnetization time TDEG start at the same time. Rectification time TOUT follows the end of first charge time TB1. Second charge time TB2 starts after the end of rectification time TOUT, and ends at the same time when demagnetization time TDEG ends.

According to an embodiment of the invention, operating power voltage $VSR_{DD}$ for synchronous rectifier circuit 620A is maintained higher than 5.5V, no matter how much output power voltage $V_{OUT}$ is. Operating power voltage $VSR_{DD}$ is efficiently built up because operating power capacitor CSR is charged up by secondary-side current $I_{SEC}$ when transformer TF demagnetizes.

In case that output power voltage $V_{OUT}$ is allowed to vary in the range between 3.5V to 20V and that operating power voltage $VSR_{DD}$ is kept to be about 5.5V, it implies that voltage $V_{SEC}$ across secondary winding SEC has maximums ranging from 9V(=3.5V+5.5V) to 25.5V(20V+5.5V), about a 3-fold voltage variation range (~25.5/9). This will help operating power voltage $V_{DD}$, that supplies power to power controller 18 in FIG. 1, vary roughly within another 3-fold voltage variation range. For example, if power controller 18 requires operating power voltage $V_{DD}$ to have a minimum of 10V, power pin VDD of power controller 18 of this embodiment might need only to tolerate an input voltage as low as about 30V.

Figure 13:
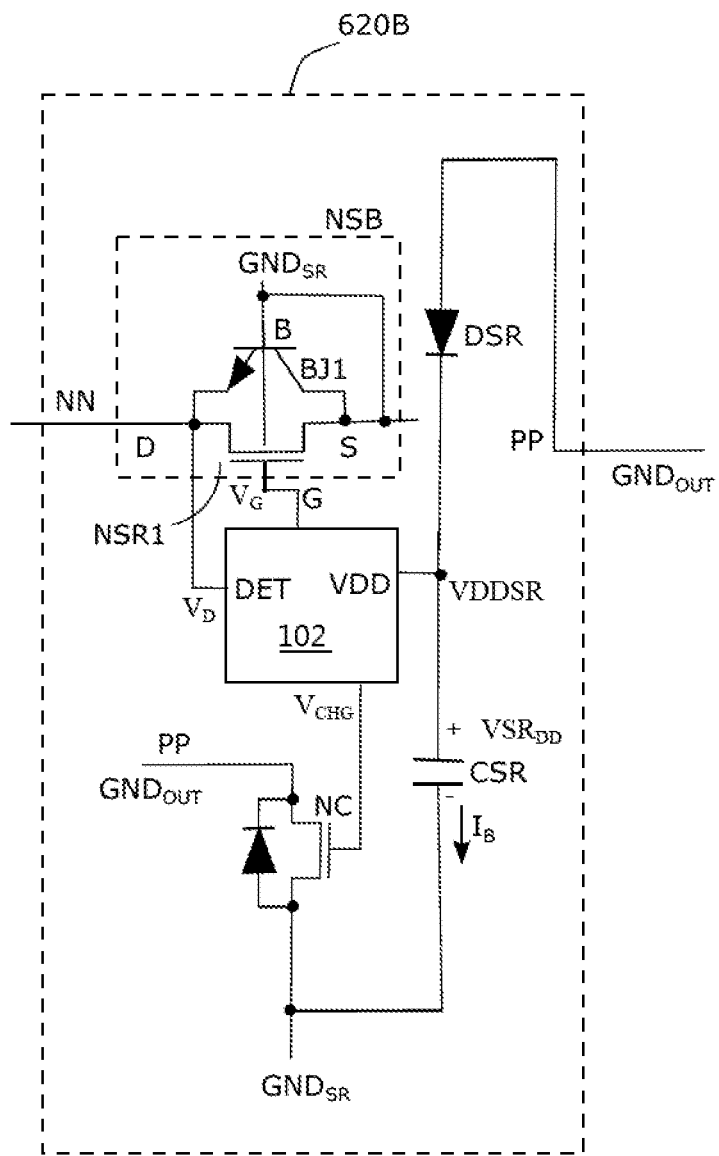
FIG. 13 shows synchronous rectifier circuit 620B, an example of synchronous rectifier circuit 620 in FIG. 9.

FIG. 13 shows synchronous rectifier circuit 620B, an example of synchronous rectifier circuit 620 in FIG. 9. Similar or the same aspects between synchronous rectifier circuit 620B in FIG. 13 and synchronous rectifier circuit 120B in FIG. 7 are not detailed herein because they are comprehensible based on the aforementioned teaching. Diode DSR in FIG. 13, different from the corresponding one in FIG. 7, is connected between anode node PP and operating power capacitor CSR.

Figure 14A:
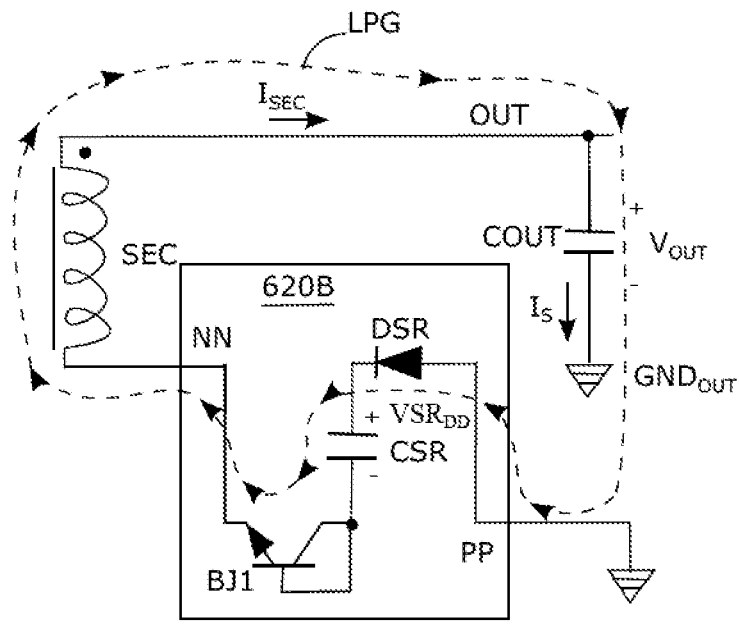
FIG. 14A demonstrates loop LPG that secondary-side current $I_{SEC}$ follows when rectifier switch NSR1 and auxiliary switch NC in FIG. 13 are turned OFF.

FIG. 14A demonstrates loop LPG that secondary-side current $I_{SEC}$, which is positive and occurs during demagnetization time TDEG, follows when rectifier switch NSR1 and auxiliary switch NC in FIG. 13 are turned OFF. Loop LPG provides a charge path for powering operating power capacitor CSR. Following loop LPG, secondary-side current $I_{SEC}$ charges output power capacitor COUT and operating power capacitor CRS at the same time. Loop LPG is still applicable if rectifier switch NSR1 and auxiliary switch NC in FIG. 13 are turned ON and OFF respectively, but bipolar junction transistor BJ1 in FIG. 14A should be replaced by turned-ON rectifier switch NSR1.

Figure 14B:
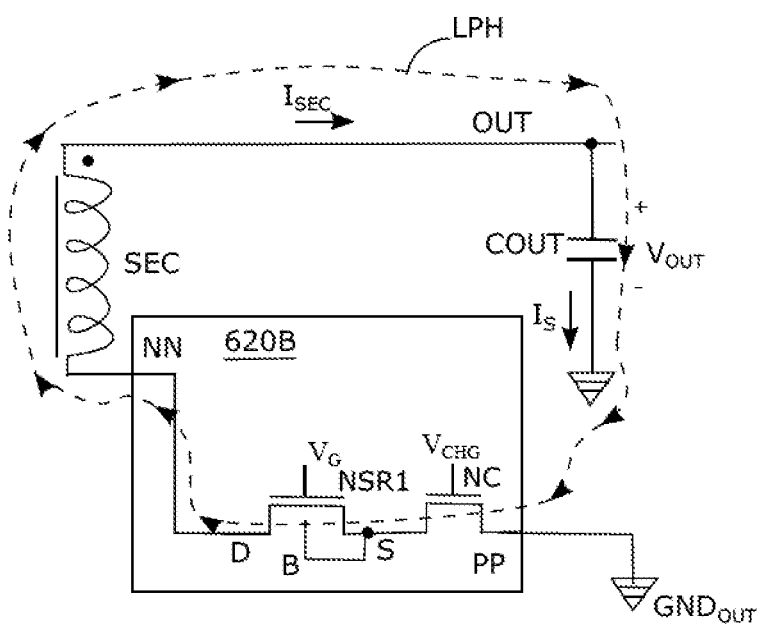

FIG. 14B demonstrates loop LPH that secondary-side current $I_{SEC}$ follows when both rectifier switch NSR1 and auxiliary switch NC in FIG. 13 are turned ON during demagnetization time TDEG. Loop LPH provides a charge path not charging operating power capacitor CRS. Following loop LPH, secondary-side current $I_{SEC}$ charges output power capacitor COUT, but leaves operating power capacitor CRS uncharged.

Each of synchronous rectifier circuits 620A and 620B could replace any one of traditional diodes according to embodiments of the invention. It not only provides rectification that directs current flowing a one-way path from anode node PP to cathode node NN, but also builds up by itself operating power voltage $VSR_{DD}$ needed for its own operation.

Figure 15:
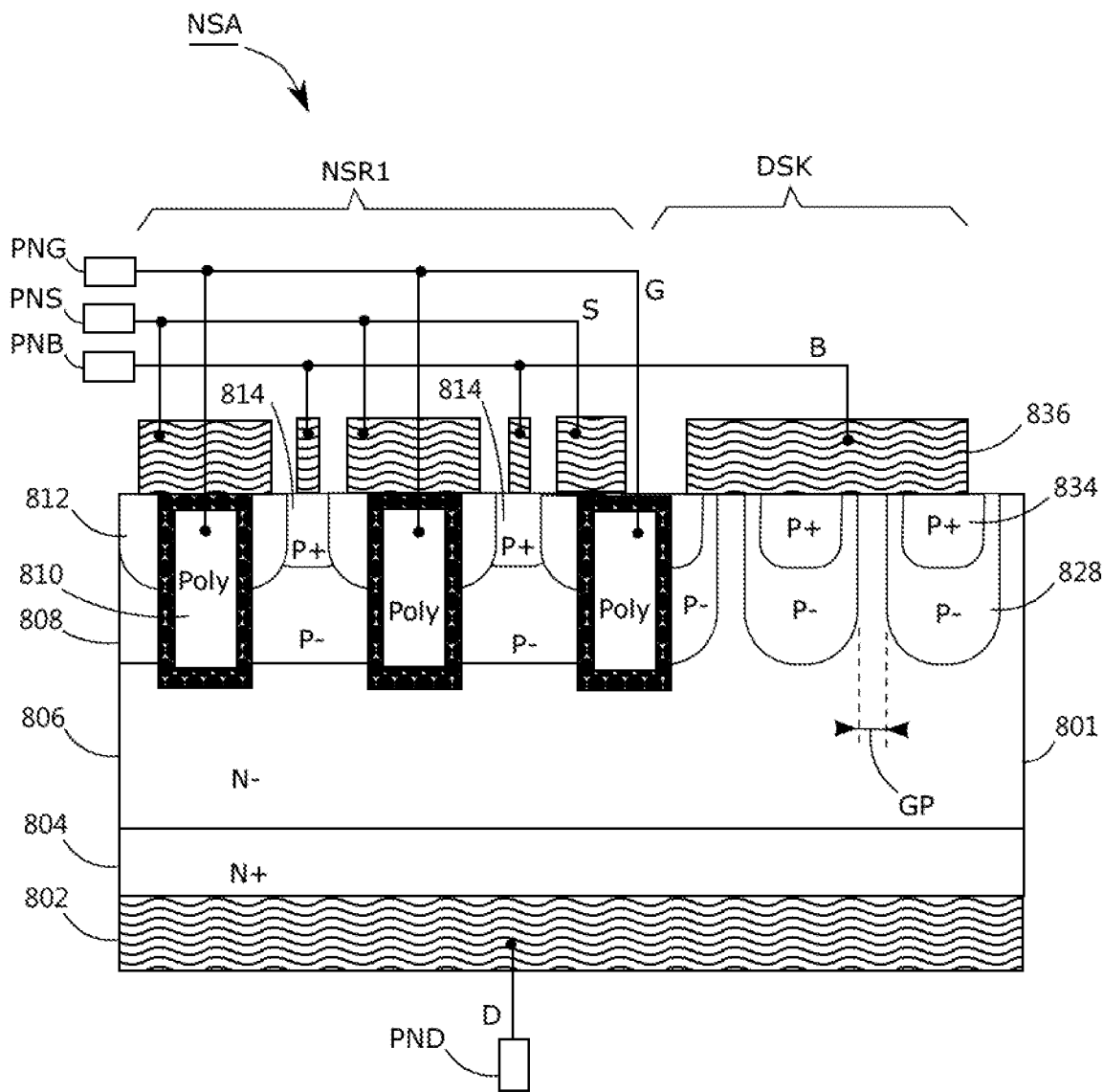
FIG. 15 shows high-voltage electric device NSA, in which rectifier switch NSR1 and schottky barrier diode DSK are formed and integrated on a monocrystal chip.

According to an embodiment of the invention, rectifier switch NSR1 and schottky barrier diode DSK in FIG. 2 or 10 are formed together on a monocrystal chip packaged as high-voltage electric device NSA shown in FIG. 15 with 4 pins corresponding to drain D, body B, source S and gate G. Each of schottky barrier diode DSK and the junction between body B and drain D could have a breakdown voltage higher than 100V. Since source S and body B are configured to not short to each other, the source voltage at source S is capable of being different from the body voltage at body B.

FIG. 15 demonstrates high-voltage electric device NSA, in which rectifier switch NSR1 and schottky barrier diode DSK are formed and integrated on monocrystal chip 801. As shown in FIG. 15, rectifier switch NSR1 is a vertical N-type MOS transistor, having poly-silicon layers 810 as gate G, back-side metal 802, N-type heavily-doped layer 804 and N-type lightly-doped layer 806 as drain D, P-type lightly-doped body layers 808 and P-type heavily-doped layers 814 as body B, and N-type heavily doped layers 812 as source S. Via the help of metal interconnection, gate G, drain D, body B, and source S are correspondingly connected to pins PNG, PND, PNB and PNS of an integrated-circuit package. In FIG. 15, metal layer 836 acts as the anode of schottky barrier diode DSK, and N-type lightly-doped layer 806 as the cathode of schottky barrier diode DSK. Schottky barrier diode DSK further has p-type lightly-doped body layers 828 and p-type heavily-doped layers 834, both electrically connected to metal layer 836. Gap GP between two adjacent p-type lightly-doped body layers 828 could be used to adjust the breakdown voltage of schottky barrier diode DSK. It is comprehensible that p-type lightly-doped body layer 808 and p-type lightly-doped body layer 828 are formed by way of the same process flow and the same process conditions, so they have the same impurity concentration and the same junction depth. Analogously, p-type heavily-doped layers 814 and p-type heavily-doped layers 834 are formed by way of the same process flow and the same process conditions, so they have the same impurity concentration and the same junction depth.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A rectifier circuit, comprising:
an anode node and a cathode node;
an operating power capacitor, across which is an operating power voltage;
a rectifier switch and an auxiliary switch, electrically coupled to each other; and
a rectifier controller, supplied power by the operating power capacitor for controlling the rectifier switch and the auxiliary switch;
wherein the rectifier controller turns OFF the auxiliary switch to support a first loop, along which a first current flows from the anode node, through the operating power capacitor, and to the cathode node, so as to charge the operating power capacitor;
the rectifier controller turns ON the auxiliary switch and the rectifier switch to support a second loop different from the first loop, where a second current, following the second loop, flows from the anode node, through the rectifier switch and to the cathode node without charging the operating power capacitor; and
the first and second loop are supported when the anode node is higher than the cathode node in view of voltage.

2. The rectifier circuit of claim 1, wherein the rectifier switch has a source, a drain, a gate and a body, the drain is electrically connected to the cathode node, and the auxiliary switch is capable of shorting the body to the anode node.

3. The rectifier circuit of claim 2, wherein the body is electrically connected to the source.

4. The rectifier circuit of claim 2, wherein the source is electrically connected to the anode node, and the rectifier circuit further comprises a schottky barrier diode connected between the body and the drain.

5. The rectifier circuit of claim 2, further comprising a diode connected between the anode node and the operating power capacitor, and the operating power capacitor is electrically connected between the diode and the body.

6. The rectifier circuit of claim 1, wherein the rectifier controller compares the operating power voltage with a reference voltage to control the auxiliary switch.

7. A power converter, comprising:
a transformer with a primary winding and a secondary winding;
a power switch, connected in series with the primary winding between two input power lines;
a synchronous rectifier circuit connected to the secondary winding, the synchronous rectifier circuit comprising:
a rectifier switch, electrically connected between one of two output power lines and the secondary winding;
an auxiliary switch, electrically coupled to the rectifier switch;
a synchronous rectifier controller, for detecting a demagnetization time of the transformer to control the rectifier and auxiliary switches, wherein the demagnetization time includes a charge time and a rectification time; and
an operating power capacitor, across which is an operating power voltage, for supplying power to the synchronous rectifier controller;
wherein, during the charge time, the synchronous rectifier controller turns OFF the auxiliary switch, and the synchronous rectifier circuit directs a secondary-side current from the secondary winding to charge the operating power capacitor; and
during the rectification time, the synchronous rectifier controller turns ON the rectifier and auxiliary switches, and the synchronous rectifier circuit directs the secondary-side current to go through the rectifier switch without charging the operating power capacitor.

8. The power converter of claim 7, wherein the charge time substantially starts with a beginning of the demagnetization time.

9. The power converter of claim 7, wherein the charge time substantially ends with an end of the demagnetization time.

10. The power converter of claim 7, wherein during the rectification time the secondary-side current flows along a loop through the rectifier switch and the auxiliary switch.

11. The power converter of claim 7, wherein during the rectification time the secondary-side current flows along a loop through the rectifier switch without flowing through the auxiliary switch.

12. The power converter of claim 7, wherein:
the power converter comprises an output power capacitor connected between the two output power lines; and
during the charge time the synchronous rectifier circuit directs the secondary-side current to charge both the output power capacitor and the operating power capacitor.

13. The power converter of claim 7, wherein:
the power converter comprises an output power capacitor connected between the two output power lines; and
during the charge time the synchronous rectifier circuit directs the secondary-side current to not charge the output power capacitor.

14. The power converter of claim 7, wherein:
the synchronous rectifier controller turns ON the auxiliary switch when the power switch is turned ON.

15. A control method in use of a power converter supplying an output power voltage across two output power lines, wherein the power converter comprises a transformer with a primary winding and a secondary winding, and a synchronous rectifier circuit connected to the secondary winding, the synchronous rectifier circuit comprises a rectifier switch and an auxiliary switch electrically coupled to each other, and the rectifier switch is electrically connected between the secondary winding and one of two output power lines, the control method comprising:

detecting a demagnetization time of the transformer to control the rectifier and auxiliary switches, wherein the demagnetization time comprises a charge time and a rectification time;

during the charge time, turning OFF the auxiliary switch, so as to direct a secondary-side current from the secondary winding to charge an operating power capacitor that supplies power to a synchronous rectifier controller controlling the rectifier and auxiliary switches; and during the rectification time, turning ON both the rectifier and auxiliary switches, so as to direct the secondary-side current from the secondary winding to build up the output power voltage and not charge the operating power capacitor.

16. The control method of claim 15, comprising:

turning OFF both the auxiliary switch and the rectifier during the charge time.

17. The control method of claim 15, wherein, during the charge time, the secondary-side current charges the operating power capacitor and builds up the output power voltage at the same time.

18. The control method of claim 15, wherein, during the charge time, the secondary-side current charges the operating power capacitor and does not build up the output power voltage.

19. The control method of claim 15, wherein the charge time starts at a beginning of the demagnetization time.

20. The control method of claim 15, wherein the charge time ends at an end of the demagnetization time.

* * * * *